(12) United States Patent
Kitamura

(10) Patent No.: US 9,311,732 B2
(45) Date of Patent: Apr. 12, 2016

(54) IMAGE PROCESSING APPARATUS, IMAGE PROCESSING PROGRAM, AND OPERATION METHOD OF IMAGE PROCESSING APPARATUS

(71) Applicant: FUJIFILM Corporation, Tokyo (JP)

(72) Inventor: Yoshiro Kitamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/668,243

(22) Filed: Mar. 25, 2015

(65) Prior Publication Data

US 2015/0199832 A1 Jul. 16, 2015

Related U.S. Application Data

(63) Continuation of application No. PCT/JP2013/005753, filed on Sep. 27, 2013.

(30) Foreign Application Priority Data

Sep. 28, 2012 (JP) ................. 2012-217957

(51) Int. Cl.
*G06K 9/00* (2006.01)
*G06T 11/20* (2006.01)
*G06T 7/00* (2006.01)

(52) U.S. Cl.
CPC ............. *G06T 11/206* (2013.01); *G06T 7/0083* (2013.01); *G06T 7/0093* (2013.01); *G06T 2207/10004* (2013.01); *G06T 2207/30101* (2013.01)

(58) Field of Classification Search
None
See application file for complete search history.

(56) References Cited

U.S. PATENT DOCUMENTS

| 2006/0159342 | A1* | 7/2006 | Sun | G06K 9/342 382/173 |
| 2007/0022067 | A1* | 1/2007 | Cremers | G06N 7/005 706/20 |
| 2007/0165949 | A1* | 7/2007 | Sinop | G06K 9/342 382/173 |
| 2008/0310743 | A1* | 12/2008 | Rother | G06K 9/38 382/238 |
| 2011/0222748 | A1 | 9/2011 | Kitamura, I | |

FOREIGN PATENT DOCUMENTS

| JP | 2010-287091 A | 12/2010 |
| JP | 2011-206531 A | 10/2011 |

OTHER PUBLICATIONS

Max W.K. Law et al., "Three Dimensional Curvilinear Structure Detection Using Optimally Oriented Flux" Proceedings of ECCV, 2008, pp. 368-382.

Alejandro F. Frangi et al., "Multiscale vessel enhancement filtering", Proceedings of MICCAI, 1998, pp. 130-137, vol. 1496.

Caihua Wang et al., "A Machine Learning Approach to Extract Spinal Column Centerline from Three-Dimensional CT Data", Proceedings of SPIE, 2009, pp. 72594T-1-72594T-8, vol. 7259.

(Continued)

*Primary Examiner* — Hadi Akhavannik
(74) *Attorney, Agent, or Firm* — Sughrue Mion, PLLC

(57) ABSTRACT

When using a graph cut process for binary labeling, labeling unit selects N (>3) pixels in image data in such a manner to represent a predetermined shape in the image, minimize the high-order energy of the Nth order or greater in which the pixel values of the N pixels are variables, and performs labeling.

8 Claims, 5 Drawing Sheets

(56) References Cited

OTHER PUBLICATIONS

Junichi Kamiyama et al., "Simultaneous extraction of multiple organs using a combination of conditional statistical shape model and graph cuts", IEICE Technical Report, 2012, pp. 299-304, vol. 111, No. 389.

Vladimir Kolmogorov et al., "What Energy Functions Can Be Minimized via Graph Cuts?", IEEE Transactions on Pattern Analysis and Machine Intelligence, Feb. 2004, pp. 147-159, vol. 26, No. 2.

International Search Report for PCT/JP2013/005753 dated Jan. 28, 2014.

* cited by examiner 0,0,0,0   1,1,1,1

IMAGE PROCESSING APPARATUS, IMAGE PROCESSING PROGRAM, AND OPERATION METHOD OF IMAGE PROCESSING APPARATUS

CROSS-REFERENCE TO RELATED APPLICATIONS

This application is a Continuation of PCT International Application No. PCT/JP2013/005753 filed on Sep. 27, 2013, which claims priority under 35 U.S.C. §119(a) to Japanese Patent Application No. 2012-217957 filed on Sep. 28, 2012. Each of the above applications is hereby expressly incorporated by reference, in its entirety, into the present application.

BACKGROUND OF THE INVENTION

1. Field of the Invention

The present invention relates to an imaging processing apparatus for dividing images into a plurality of images by using a graph cut technique, an image processing program, and an operation method of the image processing apparatus.

2. Description of the Related Art

In recent years, the minimization of energy by using a minimum cut (graph cut) algorithm of a graph has been actively applied to image processing. Specifically, efficient solutions for the problems of segmenting images (dividing regions), from the view point of minimizing energy, have been proposed.

The graph cut techniques have developed based on second-order energy depending on two variables. Meanwhile Kolmogorov et. al. have proposed a method of minimizing a submodular third-order energy depending on three variables (Non-Patent Document 1 (V. Kolmogorov and R. Zabih, "What energy functions can be minimized via Graph Cuts?", IEEE PAMI, Vol. 26, No. 2, pp. 147-159, 2004)).

Further, Patent Document 1 (Japanese Unexamined Patent Publication No. 2010-287091) has proposed a method of calculating approximate solutions of a high-order energy function by converting the high-order energy function into second-order energy, to obtain resolutions for high-order energy functions of the fourth-order or greater.

SUMMARY OF THE INVENTION

The method introduced by Non-Patent Document 1 fails to disclose the minimization of the fourth-order or higher energy. Meanwhile, the method introduced by Patent Document 1 discloses a method for solving the high-order energy function, but fails to disclose a method for utilizing the high-order energy which is effective at segmenting images.

Therefore, the present invention aims at providing an image processing apparatus that utilizes high-order energy effective for segmentation, an image processing program, and a method for operating the image processing apparatus.

An image processing apparatus of the present invention assigns a binary label to each pixel which constitutes image data by using graph cut processing, and comprises:

labeling means that selects N (>3) pixels in the image data in such a manner to represent a predetermined shape in an image and that minimizes the Nth-order energy in which the labels of the N pixels are variables, wherein the variables are represented as 0 or 1, and the labeling means sets the Nth-order energy in the case that all the variables corresponding to the selected pixels are 0 or 1 in such a manner that the Nth-order energy is smaller than the case that not all the variables are 0 or 1.

An image processing program of the present invention causes a computer to operate as an image processing apparatus that assigns a binary label to each pixel which constitutes image data by using graph cut processing, wherein the image processing program causes the computer to operate as labeling means that selects N (>3) pixels in the image data in such a manner to represent a predetermined shape in an image and that minimizes the Nth-order energy in which the labels of the N pixels are variables, the variables are represented as 0 or 1, and the labeling means sets the Nth-order energy in the case that all the variables corresponding to the selected pixels are 0 or 1 in such a manner that the Nth-order energy is smaller than the case that not all the variables are 0 or 1.

Further, an operation method of an image processing apparatus of the present invention, provided with labeling means, the image processing apparatus assigning a binary label to each pixel which constitutes image data by using graph cut processing, comprises:

a step of labeling the pixels by the labeling means selecting N (>3) pixels in the image data in such a manner to represent a predetermined shape in an image and minimizing the Nth-order energy in which the labels of the N pixels are variables, wherein the variables are represented as 0 or 1, and the labeling step sets the Nth-order energy in the case that all the variables corresponding to the selected pixels are 0 or 1 in such a manner that the Nth-order energy is smaller than the case that not all the variables are 0 or 1.

It is desirable for the same amount of energy to be set for any combination of 0 and 1 for pixels except in the cases that all of the variables are 0 and all of the variables are 1.

Further, it is desirable for the Nth-order energy to be minimized by using the max-flow-min-cut algorithm.

Further, the predetermined shape may represent any one of a straight line, a curved line, a plane, a curved surface, a circle, and a sphere.

Further, it is desirable for the image data to be images of imaged blood vessels, for the labeling means to label the blood vessels as veins and arteries, and for N pixels to be selected in such a manner that the predetermined shape represents a straight line.

Furthermore, it is desirable for the number N of the pixels, which are to be selected, to de determined in such a manner that the length of the connected N pixels becomes longer than the widths of blood vessels.

The image processing apparatus of the present invention selects N pixels in such a manner to represent a predetermined shape in an image, minimizes the high-order energy of the Nth order or greater in which the pixel values of the N pixels are variables, and performs labeling. This enables the pixels to be separated in such a manner that all the selected pixels belong to the same class, and images having characteristic shapes can be separated into regions more precisely.

Further, pixels should be selected in such a manner that a predetermined shape represented by the N pixels is any one of a straight line, a curved line, a plane, a curved surface, a circle, and a sphere. Thereby, it is possible to separate regions characterized in various shapes into regions more precisely.

Further, if the predetermined shape is a long and narrow shape as blood vessels, pixels, which are to be variables of the high energy, should be selected in such a manner to represent a straight line. Thereby, it becomes possible to separate portions, in which the vein and the artery travel in parallel with each other, into the vein and the artery precisely.

Furthermore, configuring the length of the pixels that represent straight lines to be longer than the widths of blood vessels enables pixels arranged along the traveling of the blood vessels to be classified as the same class.

DETAILED DESCRIPTION OF THE PREFERRED EMBODIMENTS

Hereinafter, an embodiment of the present invention will be described in detail with reference to the drawings. The embodiment of the present invention will provide descriptions about a method for labeling the pixels in an image and dividing images into two classes by utilizing the graph cut technique. The image processing apparatus of the present invention is provided by causing a computer to load and execute an image processing program. Further, the image processing program is stored in storage media such as CD-ROM's, and the like, distributed, and installed on computers from the storage media such as CD-ROM's, and the like. Alternatively, the image processing program is distributed via networks such as the Internet, and the like and installed on computers.

Figure 1:
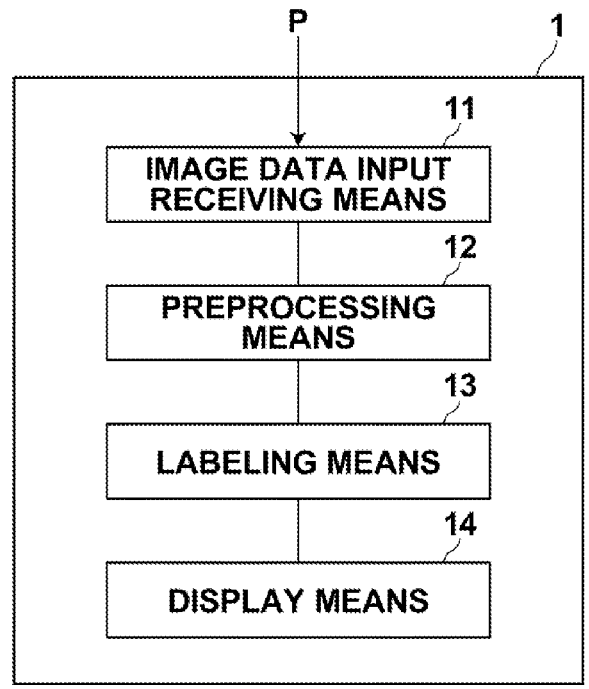
FIG. 1 is a block diagram that illustrates a configuration of an image processing apparatus 1 according to the present invention.
Figure 2:
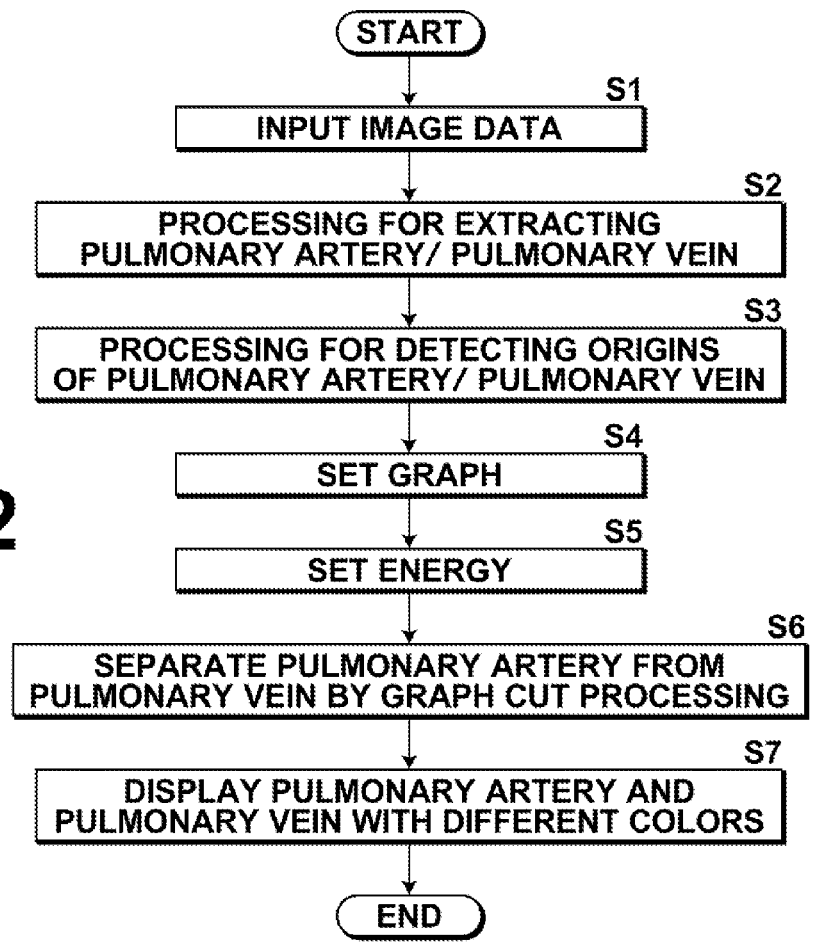
FIG. 2 is a flow chart that represents the flow of the process of the image processing apparatus 1 according to the present invention.

FIG. 1 is a block diagram that illustrates a configuration of an image processing apparatus 1 according to the present invention, and FIG. 2 is a flow chart that represents the flow of the process of the image processing apparatus 1 according to the present invention.

The image processing apparatus 1 includes image data input receiving means 11, preprocessing means 12, labeling means 13, and display means 14 as illustrated in FIG. 1.

The image data input receiving means 11 receives the input of image data P for image processing and stores the received image data P in a storage device (S1). The image data P includes plain radiographic images, tomographic images, and the like imaged by a CT scanner and an MRI device. In addition, the image data P also includes an imaged plurality of organs, tissues, or lesions.

The following describes a method, in which blood vessel regions of lungs are extracted before the respective extracted regions are separated into pulmonary arteries and pulmonary veins. Further, the image data P refers to a CT image of a chest.

The preprocessing means 12 performs extraction processing for extracting pulmonary arteries and pulmonary veins (S2). The preprocessing means 12 first extracts a blood vessel region without distinguishing between the pulmonary artery and the pulmonary vein, by utilizing a known method for detecting linear patterns, such as the Hessian filter, and the like. As a method for extracting blood vessel regions from volume data, various methods including the method disclosed in A. F. Frangi et al., "Multiscale vessel enhancement filtering", Proceedings of MICCAI, Vol. 1496, pp. 130-137, 1998 have been proposed.

Further, the preprocessing means 12 applies a known machine-learning method to detect the coordinate values of the origins of the pulmonary artery and the pulmonary vein. In the machine-learning method, a detector preliminarily learns the patterns of the origins of the pulmonary artery and the pulmonary vein, at which the respective blood vessels meet and become the thickest, and then the detector which has carried out learning is used to automatically detect the coordinate values of the origins by scanning the image data P (refer to C. Wang et al., "A Machine Learning Approach to Extract Spinal Column Centerline from Three-Dimensional CT Data", Proceedings of SPIE MI, Vol. 7259, pp. 72594T-1-72594T-8, 2009, and the like) (S3).

The labeling means 13 minimizes the energy by using the graph cut technique and assigns labels to the pixels in the image data P so as to separate the blood vessels region into the arteries and the veins. At first, a case in which the division into the pulmonary artery and the pulmonary vein is carried out by using second-order energy shown in Formula (1) will be considered.

The segmentation of images can be solved by minimizing the energy function represented by Formula (1) below that includes first-order energy $E^i$ and second-order energy $E^{ij}$, in which variables $\{x_1, x_2, \ldots x_n\}$ and $x \in \{1, 0\}$ are defined for the pixels of the images.

[Mathematical Formula 1]

$$E(x_i, \ldots, x_n) = \sum_i E^i(x_i) + \sum_{(i,j)} E^{ij}(x_i, x_j) \tag{1}$$

The first order energy $E^i$ (xi) of Formula (1) represents values that depend on only the labels assigned to the pixels, and is linearly influenced by the labels assigned to the pixels in such a manner to be determined depending on which label has been assigned to each pixel. The sum of the second term defines the energy to reflect the previous knowledge regarding the relationships between adjacent pixels and labels to be assigned to the adjacent pixels.

Figure 3:
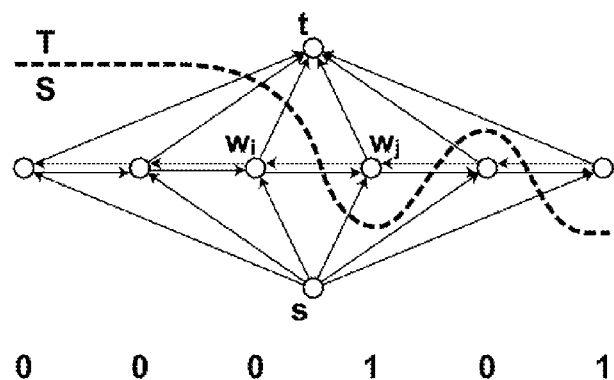
FIG. 3 illustrates one example of a graph for when an image is classified into two classes.

As illustrated in FIG. 3, a directed graph that represents Formula (1) is set (S4). The graph is constituted by vertices $x_i$ (or vertices $x_j$) corresponding to the respective pixels, two vertices s and t, edges extending from the vertex s to vertices $x_i$, other edges extending from vertices $x_i$ to the vertex t, and still other edges between vertices $x_i$ and $x_j$ corresponding to adjacent pixels, for the respective vertices $x_i$ and $x_j$. Further, the first order energy $E^i(x_i)$ is defined for the edges extending from the vertex s to vertices $x_i$ and edges extending from vertices $x_i$ to the vertex t, whereas the second energy $E^{ij}(x_i, x_j)$ is defined for the edges connecting between vertices corresponding to adjacent pixels. Energy (weight) can be determined for each edge in such a manner that labels that provide the minimum energy correspond to being subjected to the graph cut, so as to obtain labels for the respective pixels by minimizing the energy E (x) represented by Formula (1).

For example, decreasing the second-order energy $E^{ij}(x_i, x_j)$ for edges which connect between vertices corresponding to pixels of artery and vein enables the artery and the vein to be separated from each other. In the case that variables $(x_i, x_j)$ of two pixels are (0, 1) or (1, 0) (i.e., adjacent pixels are an artery and a vein, in respective), in which labels for the pulmonary artery is designated as 0 and labels for the pulmonary vein is designated as 1, luminance values change in the border between the artery and the vein. Therefore, as the differential value of the luminance between two pixels is greater, an edge connecting between the vertices corresponding to the two pixels is configured to have small energy (weight). Next, the first-order energy $E^i(x_i)$ is imparted to pixels arranged at the periphery of the origin of the pulmonary artery detected by the preprocessing means 12, in such a manner that the variable $(x_i)$ of the pixels becomes 0 (that is, the energy of $E^i(x_i$ is 1) is increased). In contrast, the first-order energy $E^i(x_i)$ is imparted to pixels arranged at the periphery of the origin of the pulmonary vein in such a manner that the variable $(x_i)$ of the pixels becomes 1.

The graph is constructed by the steps described above. Subsequently, the labeling means 13 performs the graph cut processing to separate an image into an artery region and a vein region. Consequently, the artery region and the vein region are separated by a plane in which the derivative value of the luminance of the pixels (the differential value of the luminance of the pixels) are great and which has a small contact area between the artery region and the vein region.

Figure 4:
FIG. 4 illustrates an example in which blood vessels are erroneously classified.

However, misclassification is likely to occur because blood vessels contact with each other everywhere depending on image data P. For example, when a contact surface between the artery and the vein is large, there are cases in which no changes occur in the values of the luminance that represent the border in the contact surface between the artery and the vein. In the case that the contact surface is large or changes in the values of the luminance are small, a smallest cross section will be selected as a separation plane by applying the second-order energy. As illustrated in FIG. 4, the artery or the vein will be separated at an intermediate portion thereof (void portions refer to the artery and hatched portions refer to the vein. A blood vessel extending from the vicinity of the center of the image to the left is presumed to be the vein, but is represented as the artery (void)). This is a problem because the artery and the vein are not separated by a proper contact surface therebetween.

Figure 5:
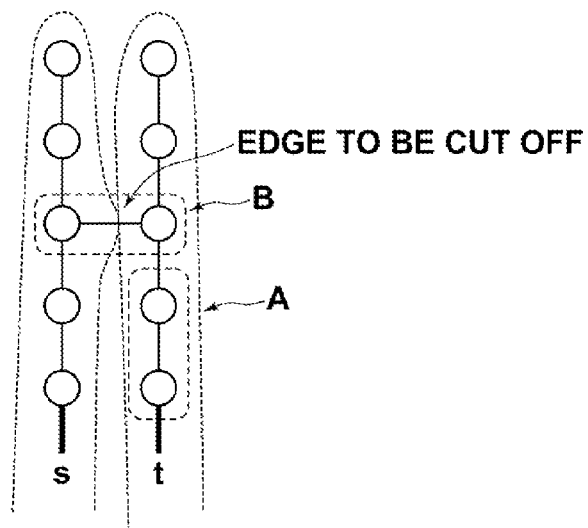
FIG. 5 is a schematic diagram illustrating a contacting portion of the artery and the vein by a graph.

Specific descriptions will be provided with reference to FIG. 5, which is a schematic diagram illustrating a contacting portion of the artery and the vein, represented by a graph. If the graph can be cut off at the center position at which two blood vessels are contacting with each other, the artery and the vein will be properly separated from each other. However, a portion A and a portion B cannot be distinguished from each other by the second-order energy. In portion A, both of the two pixels belong to t (class 0) extending from the position of the origin of the pulmonary artery. In portion B, one pixel belongs to s (class 1) extending from the position of the origin of the pulmonary vein and the other pixel belongs to t extending from the position of the origin of the pulmonary artery.

Therefore, N (>3) pixels are selected in such a manner to represent a predetermined shape in an image and the high-order energy of the Nth order or greater, in which the pixel values of the N pixels are variables, is used. The following describes a method in which the artery and the vein are separated from each other by imparting the fourth-order energy to the energy function. The energy function E, in which the fourth-order energy is imparted, is defined as Formula (2) below.

[Mathematical Formula 2]

$$E(x_i, \ldots, x_n) = \sum_i E^i(x_i) + \sum_{(i,j)} E^{ij}(x_i, x_j) + \sum_{(i,j,k,l)} E^{ijkl}(x_i, x_j, x_k, x_l) \quad (2)$$

Figure 6:
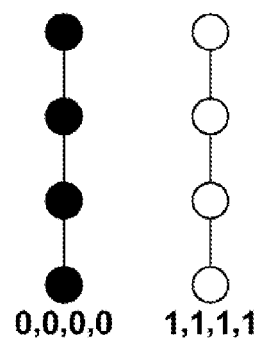
FIG. 6 illustrates an example in which four selected pixels which are linearly aligned belong to the same class.

Typically, blood vessels such as arteries, veins, and the like extend linearly. However, in the case that a portion, at which the artery and the vein intersect with each other, is erroneously separated into the artery and the vein as illustrated in FIG. 4, the blood vessel will not extend linearly but break off. Thus, in the case that the blood vessels are separated from each other, it is preferable for pixels, which are linearly arranged for a certain amount of length, to all belong to the same class. In other words, in the case that four pixels $(x_i, x_j, x_k, x_l)$ are (0, 0, 0, 0) or (1, 1, 1, 1) as illustrated in FIG. 6, the fourth-order energy $E^{ijkl}(x_i, x_j, x_k, x_l)$ should be small. Therefore, in the case of $E^{ijkl}(0, 0, 0, 0)$ or $E^{ijkl}(1, 1, 1, 1)$, the fourth-order energy $E^{ijkl}$ should be 0 whereas in the other cases, a constant weight a (>0) should be given.

TABLE 1

| $E^{ijkl}$ = | $E^{ijkl}(0,0,0,0)$ | $E^{ijkl}(0,0,0,1)$ | $E^{ijkl}(1,0,0,0)$ | $E^{ijkl}(1,0,0,1)$ | = | 0 | a | a | a |
|---|---|---|---|---|---|---|---|---|---|
| | $E^{ijkl}(0,0,1,0)$ | $E^{ijkl}(0,0,1,1)$ | $E^{ijkl}(1,0,1,0)$ | $E^{ijkl}(1,0,1,1)$ | | a | a | a | a |
| | $E^{ijkl}(0,1,0,0)$ | $E^{ijkl}(0,1,0,1)$ | $E^{ijkl}(1,1,0,0)$ | $E^{ijkl}(1,1,0,1)$ | | a | a | a | a |
| | $E^{ijkl}(0,1,1,0)$ | $E^{ijkl}(0,1,1,1)$ | $E^{ijkl}(1,1,1,0)$ | $E^{ijkl}(1,1,1,1)$ | | a | a | a | 0 |

This energy $E^{ijkl}$ is expressed by a pseudo-Boolean expression below:

$$E^{ijkl} = a(1 - x_i * x_j * x_k * x_l - (1-x_i)(1-x_j)(1-x_k)(1-x_l)).$$

(regarding the pseudo-Boolean expression, refer to Japanese Unexamined Patent Publication No. 2010-287091, and the like). In the expression above, the first term is a constant. Although the second term is the third-order or greater, the expression can be converted into the second order form by the following formula as disclosed by document above. Here, w is a newly added term and a binary variable. The smallest values are given to $x_i, x_j, x_k, x_l$ in the function after conversion, and the smallest values are given to $x_i, x_j, x_k, x_l$ in the function before conversion as well. If the second term is fourth-order, the fourth-order term will be converted into the second-order form by Formula (3) below:

[Mathematical Formula 3]

$$-x_i x_j x_k x_l = \min_{w \in \{0,1\}} -w(x_i + x_j + x_k + x_l - 3). \quad (3)$$

Similarly, one additional variable can comply with any level of order, as shown in Formula (4) below:

[Mathematical Formula 4]

$$-x_1 \ldots x_n = \min_{w \in \{0,1\}} -w(x_1 \ldots x_n - (n-1)). \quad (4)$$

Next, the third term in the expression above can be converted to the second-order form by Formula (5) below:

[Mathematical Formula 5]

$$-(1-x_i)(1-x_j)(1-x_k) = \min_{w \in \{0,1\}} (1-w)(x_i + x_j + x_k - 1). \quad (5)$$

Further, if the third term is fourth-order, the fourth-order term can be converted into the second-order form by Formula (6) below:

[Mathematical Formula 6]

$$-(1-x_i)(1-x_j)(1-x_k)(1-x_l) = \min_{w \in \{0,1\}} (1-w)(x_i + x_j + x_k + x_l - 1). \quad (6)$$

Similarly, one additional variable can comply with any level of order, as shown in Formula (7) below:

[Mathematical Formula 7]

$$-(1-x_1) \ldots (1-x_n) = \min_{w \in \{0,1\}} (1-w)(x_1 \ldots x_n - 1). \quad (7)$$

Figure 7:
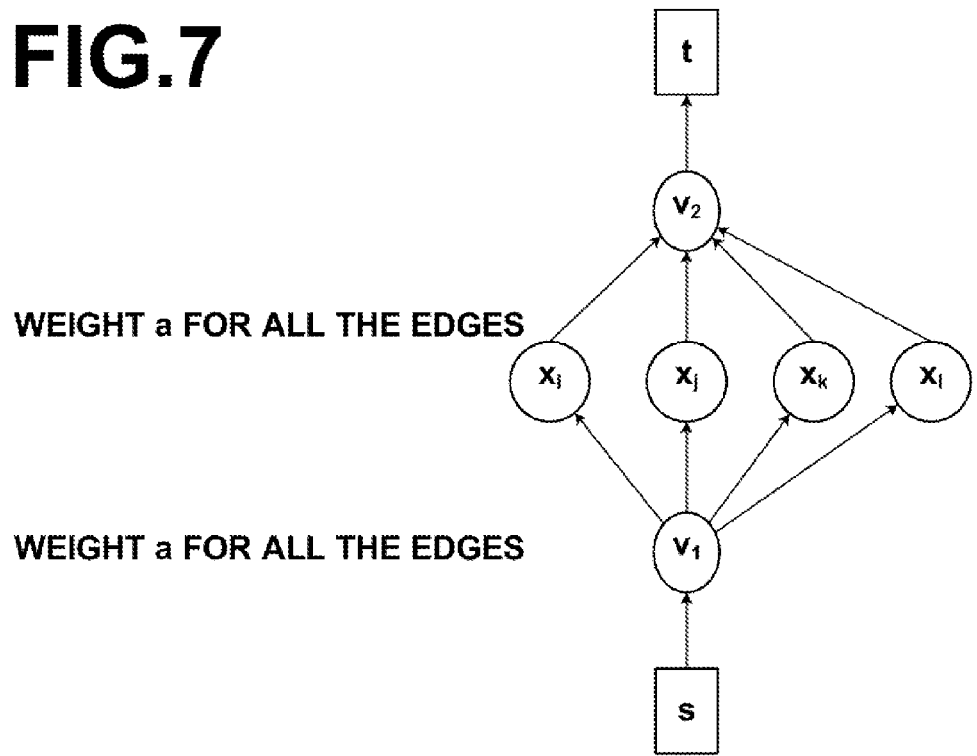
FIG. 7 illustrates one example of a graph of the conversion of the fourth-order energy.

FIG. 7 illustrates a graph of these conversions above. The graph is constituted by edges connecting vertices $x_i$, $x_j$, $x_k$, $x_l$, which correspond to four pixels, and a virtual vertex $v_1$, other edges connecting the vertices $x_i$, $x_j$, $x_k$, $x_l$, which correspond to four pixels, and a virtual vertex $v_2$, an edge connecting the virtual vertex $v_1$ and a vertex s, and another edge connecting the virtual vertex $v_2$ and a vertex t. The virtual vertices $v_1$ and $v_2$ are virtual vertices which have respectively been added to between the vertices $x_i$, $x_j$, $x_k$, $x_l$ and the vertex s and between the vertices $x_i$, $x_j$, $x_k$, $x_l$ and the vertex t. Further, the weight of each edge is a.

The energy in the form as indicated in Table 1 is capable of being minimized by the known conversion process. Further, N may be greater than or equal to 4. It is possible to increase the number of vertices in accordance with the N pixels and to add two virtual vertices $v_1$ and $v_2$ so that the conversion can be expressed by a graph similar to that of FIG. 7. The values of the coefficients of the $x_i x_j x_k x_l$ term may differ from the values of the coefficients of the $(1-x_i)(1-x_j)(1-x_k)(1-x_l)$ term. Here, cases, in which two values of the coefficients are the same, are discussed, but two values of the coefficients may differ from each other or either thereof may be used depending on applications to be applied. In the graph, two vertices, i.e., the $x_i x_j x_k x_l$ term and the $(1-x_i)(1-x_j)(1-x_k)(1-x_l)$ term respectively correspond to edges connecting the vertex t and the vertices $x_i x_j x_k x_l$ via the virtual vertex $v_2$ and edges connecting the vertex s and the vertices $x_i x_j x_k x_l$ via the other virtual vertex $v_1$. Energy is imparted to the respective edge depending on the coefficients of the original terms.

Note that it is difficult to optimize the typical form, in which all the values of the matrix elements differ from each other, because a great number of virtual vertices will be added in accordance with the conversion. In contrast, there is an advantage for the manner in which the energy is represented as in Table 1 to reduce the amount of calculation.

Therefore, a graph, in which the graph of the fourth-order energy is added to the graph of the first-order energy and the second-order energy illustrated in FIG. 3, is generated (S4). Then, the energy is set to each edge in the graph (S5).

Figure 8:
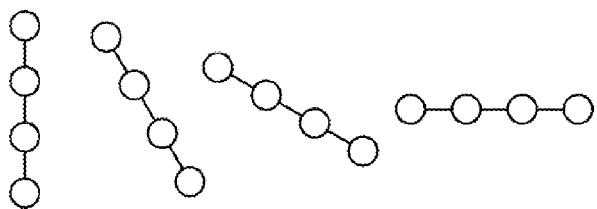
FIG. 8 illustrate an example of sets of linear pixels, which are respectively aligned in various directions.
Figure 9:
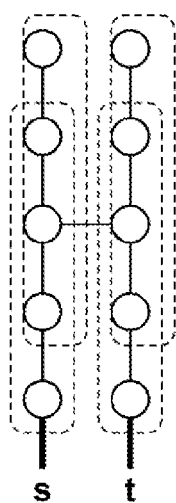
FIG. 9 is a diagram for describing the relationships between four pixels and energy to be set.
Figure 10:
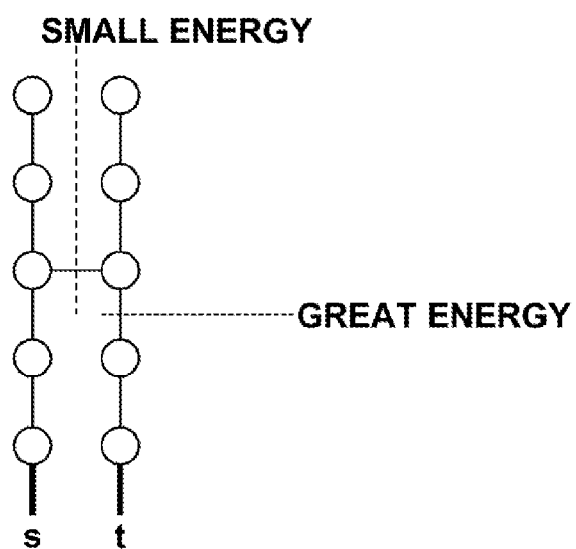
FIG. 10 is a diagram for describing the separation of the aligned four pixels.

When actual blood vessels are separated into the artery and the vein, the energy will be set while applying straight lines having different directions to the blood vessels. For example, pixels, which are aligned along the straight lines extending in a plurality of directions such as a vertical direction, an oblique direction, a horizontal direction, and the like, are selected as illustrated in FIG. 8, and the fourth-order energy is set thereto. When these lines are applied to portions where the artery and the vein travel side by side, a great energy will be set in the case that the same label is assigned to the aligned four pixels, as illustrated in FIG. 9. Consequently, the energy of the contact surface between the pixels of the artery and the pixels of the vein becomes relatively small as illustrated in FIG. 10, resulting in the graph being cut off at the position. This provides the desirable result of the separation.

As described above, the artery region can be separated from the vein region (S6) in such a manner that four pixels, which extend linearly to constitute a blood vessel, belong to the same class at all the positions by setting the energy and performing the graph cut process. Further, it has been known that regarding the minimum cut off of the graph, the global minimization can be achieved by effectively using the maximum flow algorithm. The energy minimization is performed by using the maximum-flow minimum-cut-off algorithm.

The display means 14 displays images, in which the colors of the pulmonary arteries and pulmonary veins differ from each other, on the display device according to the results of the labeling means 13 (S7).

The descriptions above provide the case that the fourth-order energy is applied, in which four pixels are linearly aligned. However, the ninth-order energy for when nine pixels are linearly aligned and the thirteenth-order energy for when thirteen pixels are linearly aligned may be applied as well, for example. It is desirable for the number of the aligned pixels to be determined to be greater than the diameters of the blood vessels so as not to select pixels aligned to traverse the direction of the traveling of the blood vessels.

Even the high-order energy of the fourth-order or greater can be represented by a graph, as illustrated in FIG. 7. Such a graph is constituted by edges connecting vertices corresponding to N pixels and a virtual vertex, an edge connecting the virtual vertex and a vertex t, and another edge connecting the other virtual vertex and a vertex s. The virtual vertices have been added to the graph.

Figure 12:
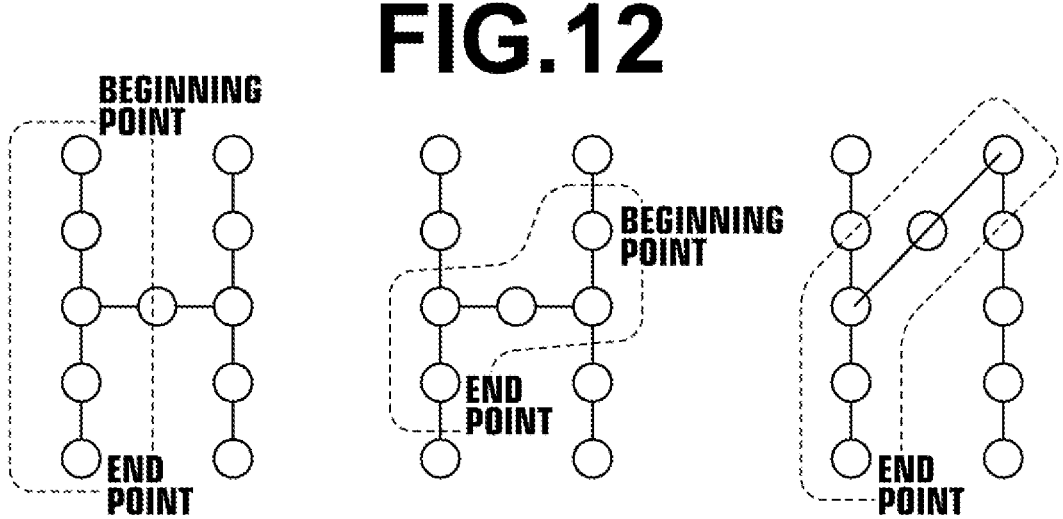
FIG. 12 illustrates an example in which pixels are selected along a straight line connecting between two points which are spaced apart from each other by a fixed distance.

The actual blood vessels are curved and branch off, and therefore it is necessary for straight lines to be flexibly applied to the blood vessels. Therefore, assuming two points which are spaced apart from each other by a fixed distance, the shortest route therebetween is searched for, as illustrated in FIG. 12. Then, the feature value that indicates the likelihood of being a straight line is considered for the route represented by N pixels selected in such a manner. For example, the index value of the likelihood of being a straight line is obtained by using the length of the route of the N pixels and the direct distance between a beginning point and an end point of the N pixels, as shown in the expression below:

The index value of the likelihood of being a straight line=the length of the route/the direct distance.

The index value will approach 1 as the route is more linear, and the index value will become greater as the route is more curved. Selected N pixels, which represent more linear route, are desired to be classified as the same class. Therefore, as the index value of the likelihood of being a straight line approaches 1, greater energy a should be set to each edge in FIG. 7. When the index value of the likelihood of being a straight line is deviated from the range of straight line, the energy should be set small.

Figure 13:
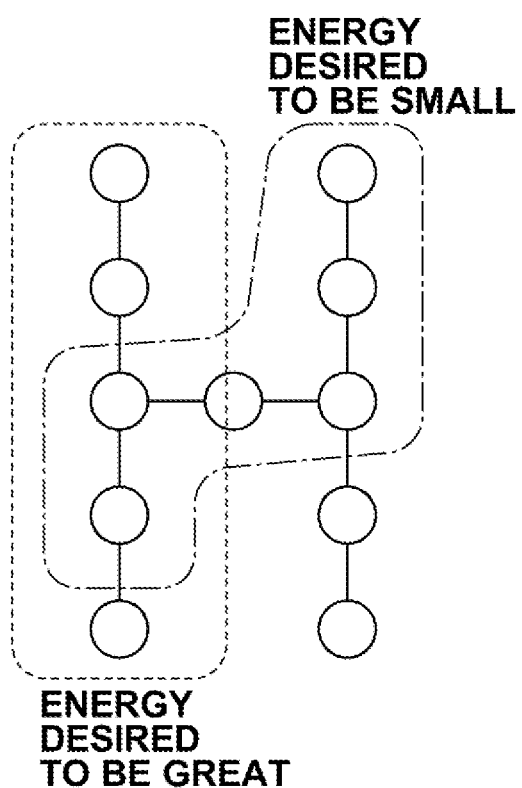
FIG. 13 is a diagram for describing derivative values on routes.

Further, derivation values of the luminance values at the respective selected N pixels are obtained, and the maximum value of the obtained derivation values is calculated. When there is a great derivation value in the route, there is a high possibility that the position of the great derivation value is the border between different blood vessels. Accordingly, a small energy a is set to the part thereof so as to be easily cut off (refer to FIG. 13). In addition to such a manner, energy may be set based on various feature values such as angles at which routes are curved, and a maximum angle at which routes are curved, to distinguish the likelihood of being blood vessels.

The foregoing described the technique for separating linear structures from images by selecting four or more pixels which are linearly aligned when setting the high-order energy. In addition to such a case, selecting pixels that forms shapes approximate to various shapes such as a curved line, a plane, a curved surface, a circle, and a sphere enables structures having such shapes to be separated from images.

Figure 11:
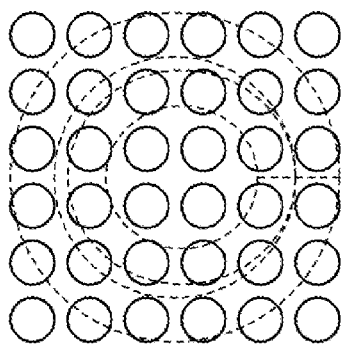
FIG. 11 is a diagram for describing a manner of selecting circularly-arranged pixels.

For example, selecting pixels, which are arranged in a circular or circular arc pattern as illustrated in FIG. 11, when setting the high-order energy is effective for the segmentation of outlines of blood vessels. One of the methods for filtering circular arc patterns is known as the Optimally Oriented Flux technique (M. Law and A. Chung, "Three Dimensional Curvilinear Structure Detection Using Optimally Oriented Flux", Proceedings of ECCV, pp. 368-382, 2008). The outlines of circular shapes can be captured in accordance with this technique. It is preferable for pixels on the circumference of the circle to be selected when a high response of a filter is obtained and for the energy to be set in such a manner that all of the pixels belong to the same label.

Further, when segmenting pixels arranged in the three-dimensional space, the high-order energy may be set by selecting pixels in such a manner to form a plane, a curved surface, a sphere. For example, the direction in which the second derivation becomes maximum in each position of an image can be obtained by using the Hessian matrices analysis technique (A. F. Frangi et al., "Multiscale vessel enhancement filtering", Proceedings of MICCAI, Vol. 1496, pp. 130-137, 1998.). Then, pixels are selected in such a manner to form a linear line in a direction perpendicular to the obtained direction, and the energy is set. In such a manner, a smooth surface of a divided region along the outline of a target structure can be obtained. Further, the Hessian matrices analysis technique can obtain information regarding which structure is likely to be at the position of each pixels among a point, a line, and a surface. If the target is likely to be a plane, the high-order energy is set to a pixel group disposed in the plane. If the target is likely to be a point, the high-order energy is set to a pixel group on the circumference thereof according to the size of the point. In such a manner, a smooth surface of a divided region can be obtained along the outline of the target structure.

As described above, estimating the directivity for each pixel before selecting pixels will provide better results to select N pixels and set the Nth-order energy in such a manner to correspond to the shapes specified by the present invention.

As described in detail above, the present method enables structures having specific shapes to be separated into regions more precisely by utilizing high-order energy.

What is claimed is:

1. An image processing apparatus that assigns a binary label to each pixel which constitutes image data by using graph cut processing, comprising:
    labeling unit that selects N (>3) pixels in the image data in such a manner to represent a predetermined shape in an image and that minimizes the Nth-order energy in which the labels of the N pixels are variables, wherein
    the variables are represented as 0 or 1, and
    the labeling unit sets the Nth-order energy in the case that all the variables corresponding to the selected pixels are 0 or 1 in such a manner that the Nth-order energy is smaller than the case that not all the variables are 0 or 1.

2. The image processing apparatus of claim 1, wherein the same amount of the energy is set for any combination of 0 and 1 for pixels except in cases that all of the variables are 0 and all of the variables are 1.

3. The image processing apparatus of claim 1, wherein the Nth-order energy is minimized by using the max-flow-min-cut algorithm.

4. The image processing apparatus of claim 1, wherein the predetermined shape represents any one of a straight line, a curved line, a planar, a curved surface, a circle, and a sphere.

5. The image processing apparatus of claim 1, wherein the image data is an image of imaged blood vessels,
    the labeling unit labels the blood vessels as a vein and an artery, and
    N pixels are selected in such a manner that the predetermined shape represents a straight line.

6. The image processing apparatus of claim 5, wherein the number N of the pixels to be selected is determined in such a manner that the length of the connected N pixels becomes longer than the width of a blood vessel.

7. A non-transitory recording medium, in which an image processing program that causes a computer to operate as an image processing apparatus that assigns a binary label to each pixel which constitutes image data by using graph cut processing has been recorded, wherein
    the image processing program causes the computer to operate as labeling unit that selects N (>3) pixels in the image data in such a manner to represent a predetermined shape in an image and that minimizes the Nth-order energy in which the labels of the N pixels are variables,
    the variables are represented as 0 or 1, and
    the labeling unit sets the Nth-order energy in the case that all the variables corresponding to the selected pixels are 0 or 1 in such a manner that the Nth-order energy is smaller than the case that not all the variables are 0 or 1.

8. An operation method of an image processing apparatus provided with labeling unit, for assigning a binary label to each pixel which constitutes image data by using graph cut processing, comprising:

a step of labeling the pixels by the labeling unit selecting N (>3) pixels in the image data in such a manner to represent a predetermined shape in an image and minimizing the Nth-order energy in which the labels of the N pixels are variables, wherein the variables are represented as 0 or 1, and the labeling step sets the Nth-order energy in the case that all the variables corresponding to the selected pixels are 0 or 1 in such a manner that the Nth-order energy is smaller than the case that not all the variables are 0 or 1.

* * * * *